(No Model.)

S. A. LEONARD.
LATHE DOG.

No. 330,245. Patented Nov. 10, 1885.

WITNESS.
S. R. Tibbitts.
James A. Marsh.

INVENTOR.
Seth A. Leonard
per Geo. W. Tibbitts
atty

N. PETERS, Photo-Lithographer, Washington, D. C.

UNITED STATES PATENT OFFICE.

SETH A. LEONARD, OF ASHTABULA, OHIO.

LATHE-DOG.

SPECIFICATION forming part of Letters Patent No. 330,245, dated November 10, 1885.

Application filed April 24, 1885. Serial No. 163,261. (No model.)

*To all whom it may concern:*

Be it known that I, SETH A. LEONARD, of Ashtabula, in the county of Ashtabula and State of Ohio, have invented certain new and useful Improvements in Lathe-Dogs, of which the following is a specification.

This invention relates to lathe-dogs, and has for its object to provide an improved means for clamping and holding the screw-threaded portion of bolts or other screw-threaded articles without injury to the threads; and it consists in the combination, with the dog, of whatever form or proportion, of self-adjusting segmental leaves arranged between the gripping parts or jaws of the dog in such a manner that said segmental leaves will adjust themselves between the threads of the bolt, thereby enabling the bolt to be gripped and held as between a split nut. These leaves are loosely fitted and held in place by cross-pins or other suitable means, and are adapted to grip either right or left hand threaded bolts, and will also fit a variety of sizes of bolts or numbers of threads. Heretofore it has been customary to employ split nuts for this purpose; but this necessitated providing a nut for each and every size of bolt or thread, thus requiring frequent changes. With my improvement these changes are avoided, making a saving of time and expense.

Figure 4:
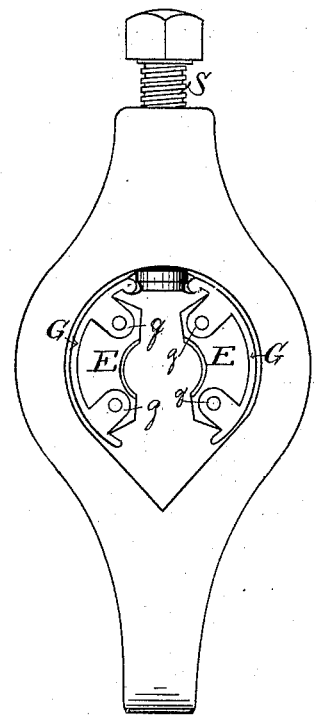
Figure 3:
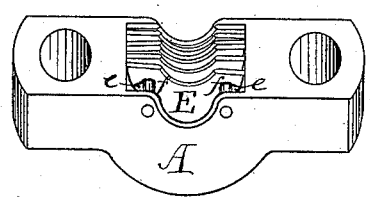
Figure 1:
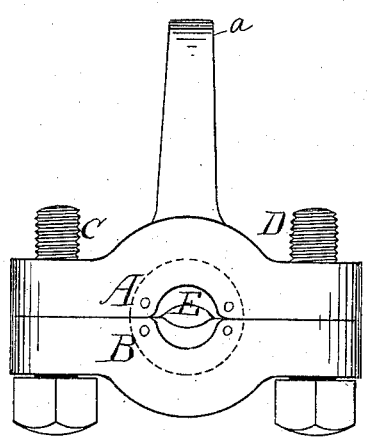
Figure 2:
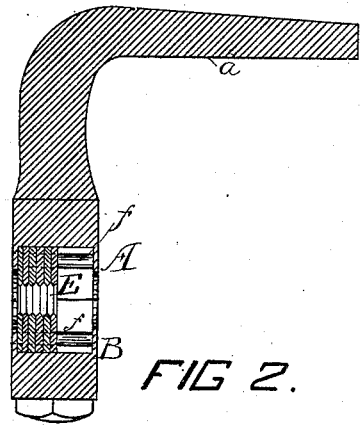

In the accompanying drawings, Figure 1 is a side view of a two-part dog, showing the fillers or leaves in place. Fig. 2 is a vertical section of same. Fig. 3 is a detached view of one part of the dog, showing the leaves in place. Fig. 4 is a side view of a pear-shaped dog having the said leaves adapted to it.

In Figs. 1 and 2, A and B are the two parts of an ordinary lathe-dog, united by two bolts, C D, the part A having the arm *a*. The adjoining faces of said parts A B are chambered to make sufficient room to receive the before-mentioned leaves.

E are segmental leaves having curved outer edges fitted to rest in the bottom of the said chambers, and having their inner edges curved inward and beveled to fit into the threads of a bolt. These leaves are loosely fitted so they may separate and spread apart to adapt themselves to the pitch of the threads of the bolt, and are thus adapted to either a right or left hand threaded bolt.

To prevent the leaves from falling out, slots *e e* are made made in their ends, and pins or rivets are passed through and secured in the sides of the chamber. This allows them to slip sidewise in the chamber, enabling them to adjust themselves as the bolt is inserted, which is done in like manner to screwing it into a nut. A sufficient number of these leaves are provided to firmly grip the bolt.

To adapt the leaves to a pear-shaped dog or a dog not separable, two curved plates, G G, are provided, having ears *g g*, for holding the pins *f f*. Said plates are linked or otherwise connected to the screw S, by which said plates may be forced into the tapering portion of the chamber for clamping the bolt.

I do not wish to be confined to any specific means of retaining the leaves in the chamber of the dog, as other equivalent means may be used for this purpose.

Having described my invention, I claim—

A lathe-dog provided with the leaves or fillers E, loosely fixed in the chambers of the dogs, and adapted for self-adjustment to clamp screw-threaded bolts, substantially in the manner and for the purpose specified.

SETH A. LEONARD.

Witnesses:
E. J. GRIFFIN,
J. F. MUNSELL.